(12) United States Patent
Zou et al.

(10) Patent No.: US 7,249,384 B1
(45) Date of Patent: Jul. 24, 2007

(54) COPY-RESISTANT READ-ONLY DIGITAL OPTICAL DISC AND ADAPTABLE PLAYER

(75) Inventors: Han Zou, Windsor, NJ (US); Terry J. Nelson, New Providence, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 844 days.

(21) Appl. No.: 09/640,360

(22) Filed: Aug. 16, 2000

(51) Int. Cl.
G06F 12/14 (2006.01)
G11B 20/12 (2006.01)
G11B 7/007 (2006.01)

(52) U.S. Cl. ..................................... 726/31; 369/53.21
(58) Field of Classification Search .................. 705/56, 705/57; 713/200, 201; 369/372, 53.21; 726/27, 31
See application file for complete search history.

(56) References Cited

U.S. PATENT DOCUMENTS

| 6,408,285 | B1* | 6/2002 | Oshima et al. ............... 705/57 |
| 6,622,132 | B1* | 9/2003 | Oshima et al. ............... 705/56 |
| 6,975,570 | B1* | 12/2005 | Gushima et al. ......... 369/47.31 |
| 2004/0260740 | A1* | 12/2004 | Liu ............................. 708/490 |

FOREIGN PATENT DOCUMENTS

JP 2002140869 A * 5/2002

OTHER PUBLICATIONS

Moradzadeh, Michael, "Licensing Requirements for the CSS DVD Copy Protection Method", Intel Corporation, 1997, pp. 1-15.
Intel Corporation, International Business Machines Corporation, Matsushita Electric Industrial Co., Ltd., Toshiba Corporation, "Content Protection System Architecture, A Comprehensive Framework for Content Protection", unknown, pp. 1-19.

* cited by examiner

*Primary Examiner*—Emmanuel L. Moise
*Assistant Examiner*—Zachary A. Davis
(74) *Attorney, Agent, or Firm*—Harness, Dickey & Pierce, PLC

(57) ABSTRACT

A copy-resistant read-only digital optical disc having encrypted digital data. The copy-resistant read-only digital optical disc includes a digital work, a variable user data format encoding said digital work after encryption with a variable software algorithm, an implementation of said variable software algorithm, and an implementation of said variable user data format encoded in a default format. The encrypted digital data is read on an adaptable digital optical disc player, which is adaptable to a user data format described on said copy-resistant read-only digital optical disc made in accordance with this invention. A copy-resistant read-only digital optical disc made in accordance with this invention will provide necessary user data format information on the disc in a default format, which is always accessible by an adaptable player.

2 Claims, 11 Drawing Sheets

COPY-RESISTANT READ-ONLY DIGITAL OPTICAL DISC AND ADAPTABLE PLAYER

TECHNICAL FIELD

This invention relates to digital optical disc, and more particularly to a copy-resistant read-only digital optical disc having encrypted digital data and its application in distribution of copy-protected content including an adaptable player.

BACKGROUND OF THE INVENTION

The present invention relates to the dilemma that confronts digital audio and video content providers as writable storage media inevitably become comparable in cost with read-only media that play in the same devices. At the same time, home computers have become common, if not ubiquitous, and peripheral drives that can transfer information to writable media are increasingly affordable. Naturally, these drives can also read the digital content from read-only media, so even a nominally honest user can be tempted to make unauthorized copies. This scenario is now affecting the digital audio market because CD-R (write-once) discs have become very inexpensive.

Video DVD content is disguised by the Contents Scramble System (CSS). CSS provides that unscrambled digital video outputs are not provided on consumer-market players. Also, unscrambled digital video outputs are not provided on consumer-market DVD-players, and current DVD-ROM drives that play video DVD discs output scrambled content to a separate licensed software or hardware decoder. But, CSS alone cannot prevent a consumer player from playing sector-by-sector copies of protected content on writable discs with a compatible format. The details of CSS system are not supposed to be public knowledge, but a general description was given by Michael Moradzadeh of Intel in "Licensing Requirements for the CSS DVD Copy Protection Method", Intel, 1997.

To inhibit playback of unauthorized sector-by-sector copies, a group of companies known as the 4C Entity proposed "Content Protection for Recordable Media" (CPRM) which is available from 4C License Entity LLC, 225B Cochrane Circle, Morgan Hill, Calif. 95037. CPRM uses a "Protected Media Identifier," when scrambling and unscrambling content. This ensures that protected content copied directly from one disc to another cannot be played back because the identifications would not match. However, CPRM does not prevent scrambled content from being copied onto a writable disc sector-by-sector, which could be the first step in illegally voiding the copy protection of a digital disc.

A sector-by-sector copy of a CPRM disc would only lack the media identifier of the original disc, which an adversary could read and try to provide during playback from an unauthorized copy. This might require only limited reverse engineering of CPRM's decryption algorithm in a software implementation on a personal computer.

Copy protection generally endangers backward compatibility of future players. Even if copy protection were to be abandoned however, the rapid evolution of optical disc technology threatens to make old discs unreadable in future players.

In spite of the teachings of the above mentioned, there is still a significant need for a copy-resistant read-only digital optical disc having encrypted digital data.

It is therefore a principal object of the present invention to provide a variable disc format that players can read but can nevertheless be changed as necessary to make sector-by-sector copying onto writable discs infeasible.

It is still another object of the present invention to provide variable software algorithms for encrypting a digital work which can be updated or even changed completely while still maintaining playability in existing players.

It is yet another object of the present invention to provide future players or drives a method of adapting to antiquated discs using information provided on the discs themselves.

SUMMARY OF THE INVENTION

The present invention is directed to a copy-resistant read-only digital optical disc having encrypted digital data and to providing digital content on read-only discs that are hard to copy because the format of the information is unpredictable. The content is furthermore encrypted with an algorithm that is chosen at the time the distribution discs are mastered. The key to these advantages is a player architecture that adapts to the user data disc format from configuration information that is provided on the disc in a default format. This configuration information will also provide a way for future generations of players to play these discs when full backward compatibility will be hard to maintain in hardware.

In a preferred embodiment of the invention, the apparatus of the present invention includes a choice of a user data encryption algorithm whose implementation is not publicly available. After encryption of the work is completed, a user data format that is incompatible with known writable-disc formats is chosen. The encrypted digital work is then encoded in the user data format to prevent sector-by-sector transfer of the content onto to a writable disc. Another format may be chosen for new titles if, with the passage of time, such writable discs become available. A description of the user data format used on a particular disc is written on the disc itself in a default format. Similarly, object code for the decryption process is placed on the disc in the user data format. If, with the passage of time, decryption becomes reverse engineered to permit unauthorized playback, new algorithms may be chosen as necessary to protect new titles.

In an alternative preferred embodiment, the apparatus of the present invention includes architecture that makes it possible for a player to read data from a copy-resistant read-only digital optical disc having encrypted digital data in a format that cannot be anticipated during the design of the player and must be discovered from the disc itself. Because the player is designed to accept data in such formats from read-only discs, physical player functions such as focusing and tracking and acquiring a channel signal may be performed with prior-art solutions. User data is extracted from the channel signal in two steps. In a first step, the channel clocks and data have to be extracted from the channel signal. This function is performed by a programmable channel bit converter that is initialized with information provided about the user data format.

In a second step of user data extraction, the process includes a SYNChronizing task. This is accomplished by waiting for a unique channel bit sequence called a SYNC code. Multiple SYNC codes may be defined and the principal requirement is that they are not present anywhere in a sequence of concatenated code words representing data bytes. The simplest use of such flags is to identify the starting channel bit of a first code word in a sequence of code words of predetermined length. Various SYNChronization processes are performed in order to access code word sequences representing various data structures that are allowed by the user-data format. The conversion of code words to data bytes may be accomplished by the use of a conventional look-up table.

The present invention interprets the user data format with the help of a single-steppable processor (SSP) architecture. Instruction executions are SYNChronized with the channel bit clock when the SSP is performing a real-time tasks. This SYNChronization allows channel bit clock cycles to be counted implicitly in the assembly language representation of the instructions. The SSP must be able to complete any instruction used in less than the channel bit clock cycle time. The SSP actually performs this SYNChronization by using the channel bit clock to trigger single-step instruction executions. The single-step mode is enabled by a flip-flop that is clocked by the channel clock and cleared by a signal from a microprocessor that signals an instruction fetch. One of the microprocessor output bits that initializes to zero is used to override the single-step mode. When the microprocessor sets that bit, it enters single-step mode with the next instruction fetch.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENT

In order to make a sector-to-sector copy of a read-only disc with protected content possible, both formats of the read-only disc and the writable disc have to be compatible. If all writable discs on the consumer markets do not have formats compatible with that of read-only discs with protected content, making a sector-to-sector copy becomes impossible. This obstacle may be compromised at a future date, but by that time read-only discs can adopt another new format to maintain incompatibility with currently available writable discs. Recognizing that new format adopted by read-only discs according to this invention may be unknown to legacy players, this invention also provides a design concept to maintain new player's read compatibility with old disc formats. A disc made in accordance with this invention will provide necessary user data format information on the disc in a default format, that is always accessible by An adaptable player. A player made in accordance with this invention is adaptable to a user data format described on a disc made according to this invention.

Figure 1:
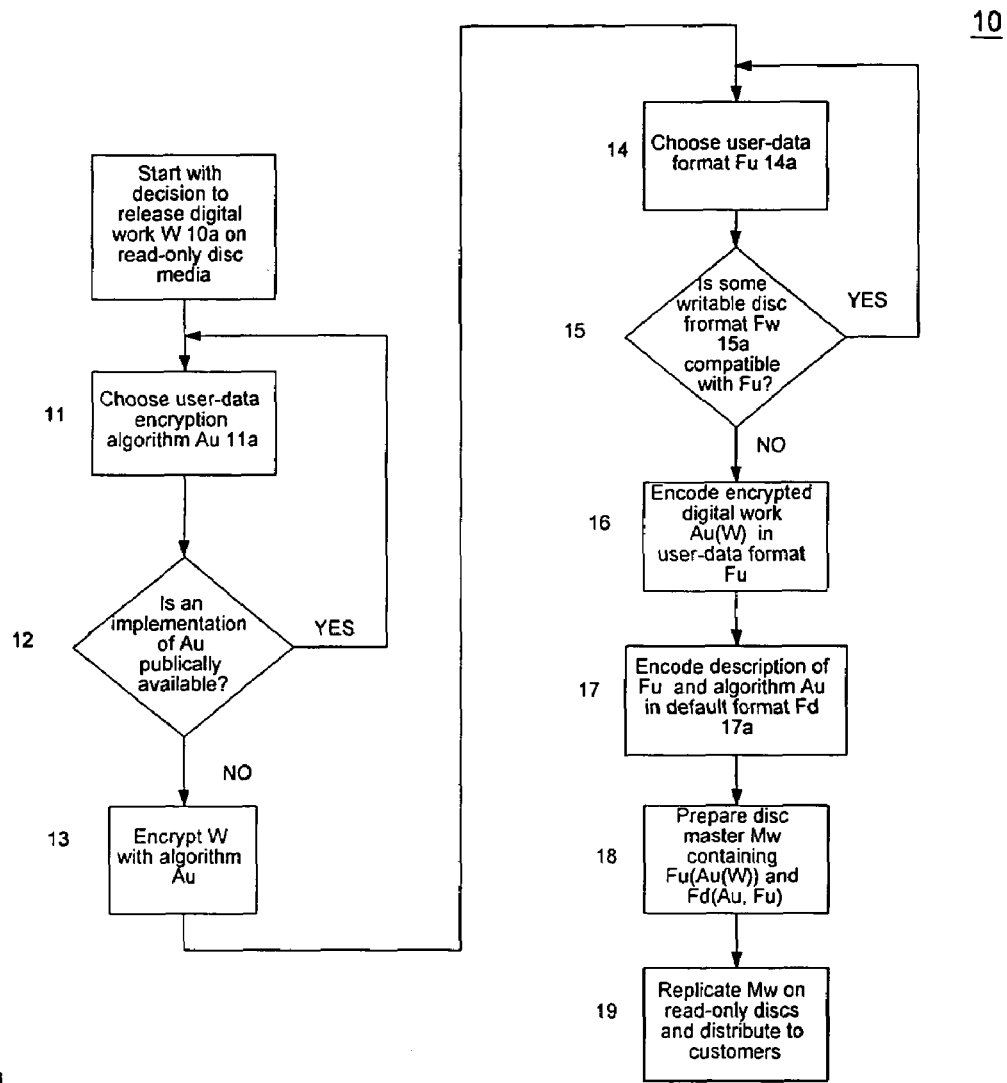
FIG. 1 illustrates the method by which a digital work is transferred to a read-only media in a format that adaptable players can read but is incompatible with writable discs.

In accordance with the above-mentioned, FIG. 1 shows the main steps of a method 10 of the present invention for transferring a digital art work W 10a to a read-only media with maximum protection. First, a content provider will choose a user data encryption algorithm Au 11a whose implementation is not publicly available. After encryption is completed, the content provider may want to choose a user data format Fu 14a, that is not compatible with known writable disc formats Fw 15a to prevent sector-to-sector copy by writable devices on the consumer market. Then, a description (or an implementation) I(Fu) of the user data format Fu 14a including an implementation of error-correction decoding (ECC) will be encoded in a default format Fd 17a. A description (or an implementation) I(Au) of the user data encryption algorithm Au 11a can be considered as part of user data and can be provided as needed. Both format description data and user data are written to the master disc, that is replicated on read-only discs. This insures two levels of protection for user data; one is at the encryption level, and the second is at the format level.

Figure 2:
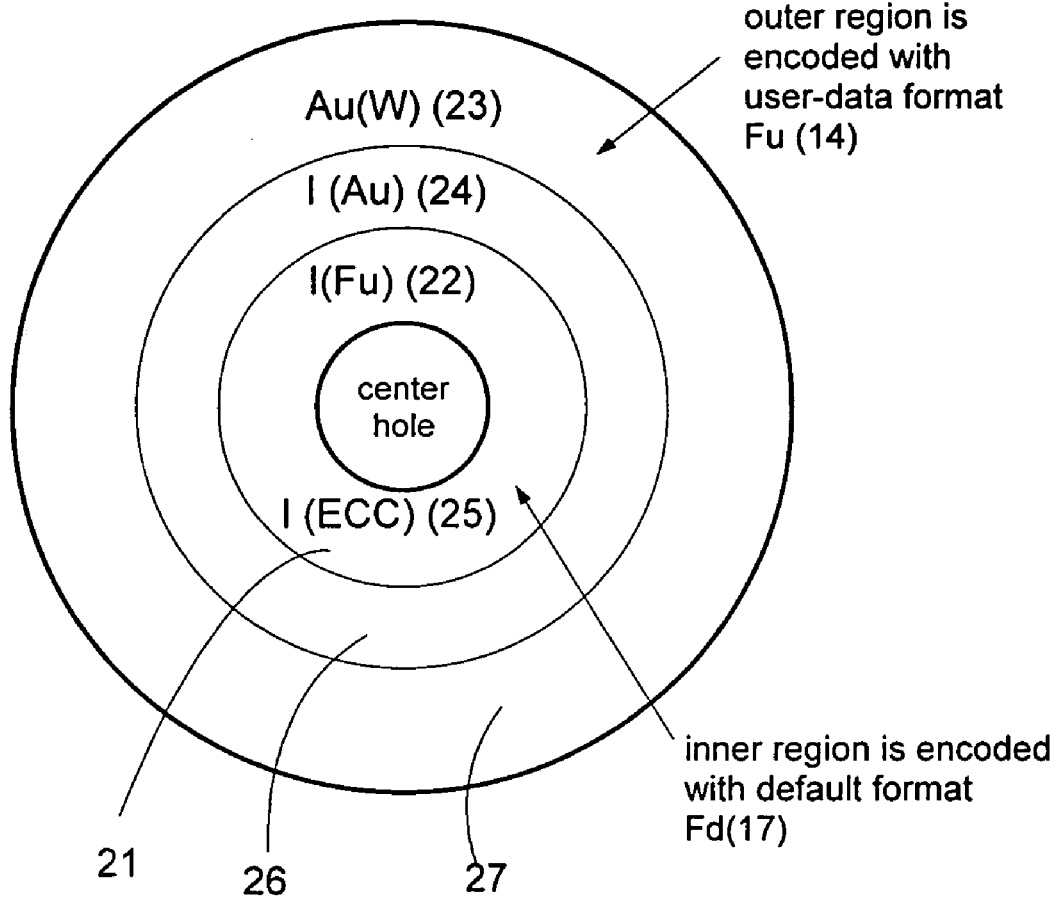
FIG. 2 illustrates a read-only disc carrying marks that represent a digital work encoded in a user data format and a description of the user data format encoded in a default format.

In FIG. 2 a schematic layout of a disc structure is depicted according to this invention, the description of the user data format I(Fu) 22, including an implementation of ECC-decoding 25 is recorded in a default format in the inner part 21 of the disc and the user data encrypted by algorithm Au 11a is recorded in user data format as AU(W) 23 in the outer part 27 of the disc. The implementation of the user data encryption algorithm I(Au) 24 is recorded in the user data format Fu 14, but in an area 26 that is directly accessible only by a drive's controller and is "invisible" for any file-system application. Since reading a disc normally starts at the inner part 21, a drive (not shown) would expect to read user data format description first in a default configuration. A player according to this invention is able to adapt itself based on the user data format description recorded in a default format to access user data. Such adaptation consists of two parts. The first part is the hardware reconfiguration, such as focus adjustment, reading wavelength, tracking strategy and so forth. For replicated content, this kind of hardware reconfiguration is minimal. The second part is instruction for a real-time process to convert the channel signal stream to a data-byte stream and to decode the raw data stream to an application data stream as needed. To insure flexible adaptation, in order to perform requested conversion and decoding a player of this invention may use a pure software implementation as long as a desired data rate is maintained.

In addition to a software implementation a hybrid design in which hardware efficiency and software flexibility are combined is possible and can be very efficient. In this embodiment of the invention, a high-efficiency hybrid implementation scheme is based on a single-chip microprocessor.

Figure 3:
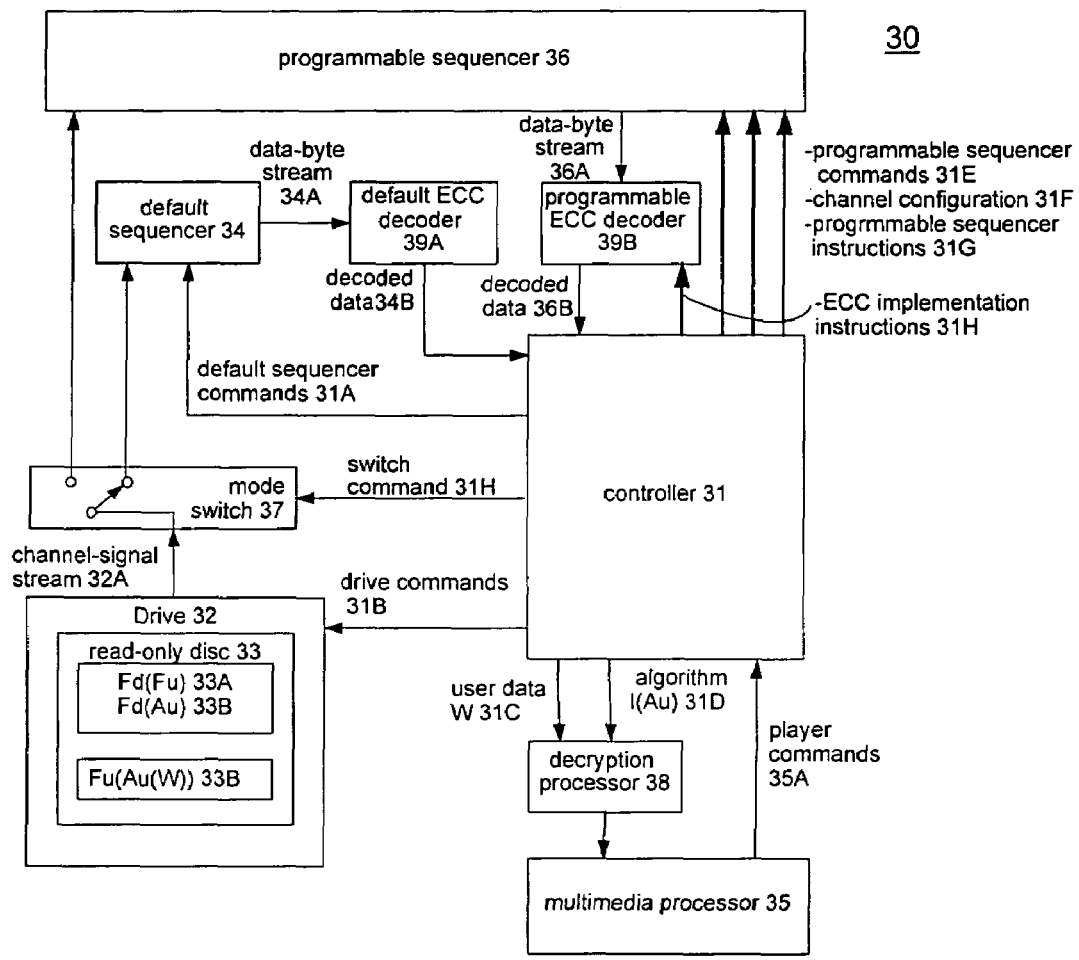
FIG. 3 illustrates an adaptable player that reads a digital work in a user data format from a read-only optical disc by first reading a description of the user data format in a default format and then using the description to adapt to the user data format.

The block diagram in FIG. 3 demonstrates the concept design of a player 30 that has a real-time processing capability based on this invention. Functions of its individual parts can be explained by following a typical reading process. Once a disc of the present invention is inserted into a drive 32 of the player 30, under the instruction of a controller 31, the drive tries to read the description of the user-data format in an area 21 on the disc in a default format (Fd) 17 and generates a corresponding channel-signal stream 32A. A mode switch 37 directs the channel-signal stream 32A to a default sequencer 34 that under instruction of default sequencer commands 31A, converts the channel-signal stream 32A to a data-bytes stream and forwards it to the default ECC-decoder 39A that returns the decoded data to the controller 31 for further interpretation. From the description data, two groups of instructive data are generated by the controller 31: a group of drive commands 31B for necessary reconfiguration and a group of real-time processing instruction including programmable-sequencer commands 31E, channel configuration 31F, programmable-sequencer instructions 31G, and programmable ECC-decoder instructions 31H. The controller starts an adaptation process by sending the reconfiguration commands to the drive 32 for necessary reconfiguration, the programmable-sequencer commands 31E, channel configuration 31F and programmable-sequencer instructions 31G to a programmable-sequencer 36 for the required real-time conversion, EEC-decoder instructions 31H to the programmable ECC-decoder 39B to perform real-time ECC-decoding and a switch command to the mode switch 37 to direct the channel-signal stream to the programmable-sequencer.

If the user data format is the same as the default format, the player 30 will read the user data in the default configuration. In a mode adapted to a user data format, the controller 31 obtains a user data stream from the programmable sequencer 36 and interprets it as needed. From the user data stream, the controller 31 generates two typical types of data: user data 31C and an implementation of the encryption algorithm I(Au) 31D, and forwards them to a decryption processor 38 if necessary and finally to an application processor 35, that can be, for example, a multimedia processor.

Figure 4:
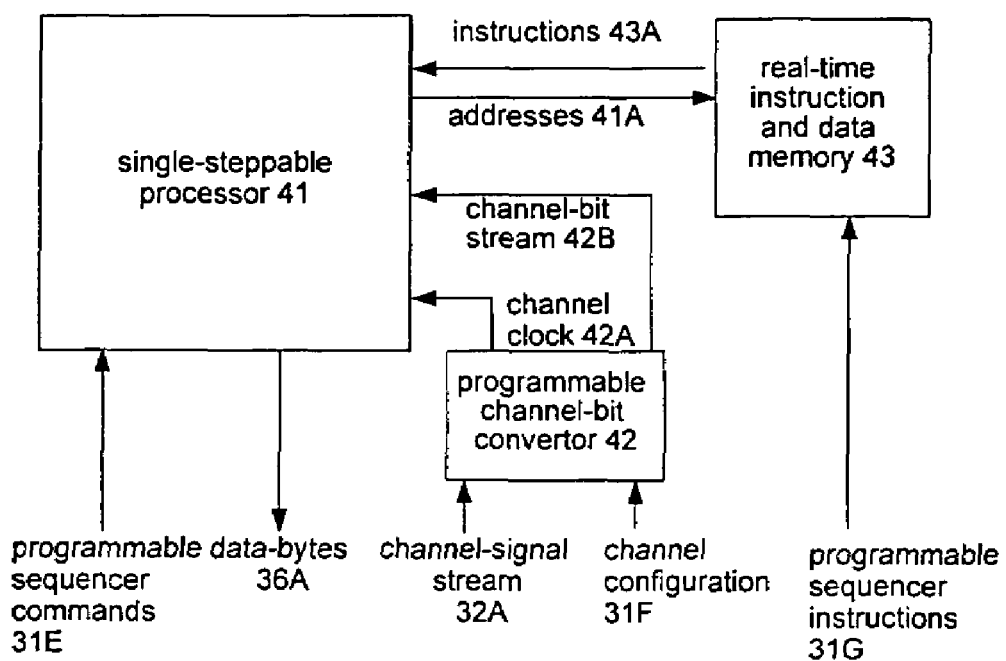
FIG. 4 illustrates a programmable sequencer that performs real-time functions that enable a player to adapt to a user data format on a read-only disc which is specified by a description on the disc in a default format.

While different implementation schemes are possible to perform the functions of individual blocks depicted in FIG. 3, FIG. 4 discloses a conversion process block diagram inside the programmable sequencer 36 which is designated as No. 40.

The task of a programmable sequencer 36 is to convert the channel signal stream 32A to the corresponding data-byte stream as depicted in FIG. 4. Within the channel signal stream 32A, both overhead and user data are encoded. The overhead part includes channel bit clock signal 42A, stream-position signal and other identification signals. The conversion consists of two steps: first, a programmable channel bit converter 42 recovers a channel bit clock signal 42A and the associated channel bit stream 42B from the channel signal stream 32A; second, a single-steppable processor 41 converts the channel bit stream 42B to a data-byte stream 36A based on the conversion algorithm described by the programmable sequencer instructions. Before the real-time process starts, the controller 31 sets a single-steppable processor 41 in its ready state by issuing at least one programmable sequencer command 31E, sets the mode of the programmable channel bit converter 42 by sending channel configuration data and loads programmable sequencer instructions into a real-time instruction memory 43. At the commencement of reading user data, the programmable channel bit converter 42 receives channel signal stream 32A continuously. Using the channel configuration, the programmable channel bit converter 42 extracts the embedded channel bit clock signal 42A and consequently converts the channel signal stream to channel bit stream 42B. Both channel bit clock signal 42A and channel bit stream 42B are forwarded to the single-steppable processor 41.

Under instruction of at least one programmable sequencer command 31E from the controller 31 and in response to a start instruction, the single-steppable processor 41 enters a single-step mode in order to perform real-time conversion in SYNChrony with the channel bit stream. The single-steppable processor 41 receives the start instruction from the instruction memory 43. After execution of the first instruction in the initial address, the single-steppable processor 41 goes into a waiting state until the next channel bit clock cycle. Once the next channel bit clock cycle arrives, the single-steppable processor 41 outputs the second address, loads the second instruction from the memory 43 and executes it. This process keeps running in SYNChrony with the channel bit clock cycle until all required instructions are executed. Finally, the single-steppable processor returns a data-byte stream to the programmable ECC decoder 39B.

The choice of the single-steppable processor 41 and the design of executable instructions have to guarantee that each execution cycle is shorter than a channel bit clock cycle and the total number of executions required to read a code word is less than the number of channel bits contained in one code word. Further, in FIG. 4, the programmable channel bit converter 42 and the real-time instruction and data memory 43 are shown as separate blocks. However, in an engineering construction, they can be integrated into a single physical chip with the processor.

Figure 5:
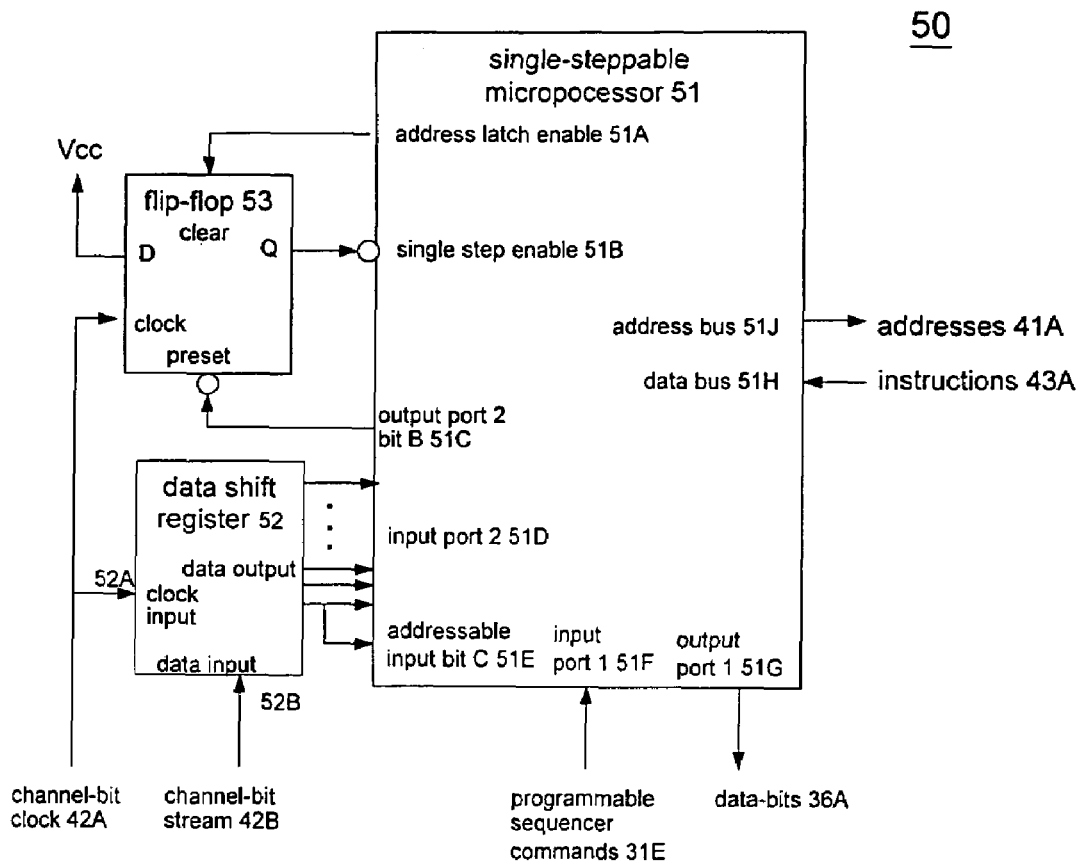
FIG. 5 illustrates a single-steppable processor that can execute instructions in one-to-one correspondence with channel bit clock pulses and is programmed to capture sequences of channel bits representing data.

In FIG. 5, the organization of the single-steppable processor (41, 50) is shown. A single-steppable microprocessor 51 executes instructions in one-to-one correspondence with an external channel bit clock cycle and is programmed to capture sequences of channel bits representing data. A shift register 52 is clocked by the external channel bit clock and used to buffer the incoming channel bit stream. The shift register 52 has a serial data input for receiving the channel bit stream and a parallel data output for sending channel bits in a fixed word length. A flip-flop circuit 53 is also clocked by the external channel bit clock and has a logic gate function which enables a single-step mode of the microprocessor 51 in correlation with completion of execution and the external channel bit clock 42A. The microprocessor 51 powers up in a free-running mode before entering a single-step mode on receiving a start instruction. This start instruction sets an output high at bit B of output port 2 and consequently sets the preset at the flip-flop 53 to low, enabling the single-step mode to be entered following the completion of the start instruction. Thereafter, the microprocessor 51 executes one instruction in response to each channel bit clock pulse, which clocks VCC at the data input of the flip-flop. This allows the microprocessor to start executing the next instruction by outputting its address. While preset is low, the microprocessor remains in single-step mode because the first address-latch-enable pulse of each instruction clears the flip-flop.

If all executions are completed and it is not necessary for the microprocessor to continue its implicit counting of channel bit clock cycles, the microprocessor returns to its "free-running mode" by setting the output port to low disabling the current single-step mode. When the preset is high, the microprocessor remains in free-running mode because the preset input of the flip-flop takes precedence over the clear-input.

During a contiguous real-time process, the channel bit stream 42B is read into the shift register 52 at a constant rate in SYNChrony with the channel bit clock and output in parallel in a fixed word length.

Figure 6:
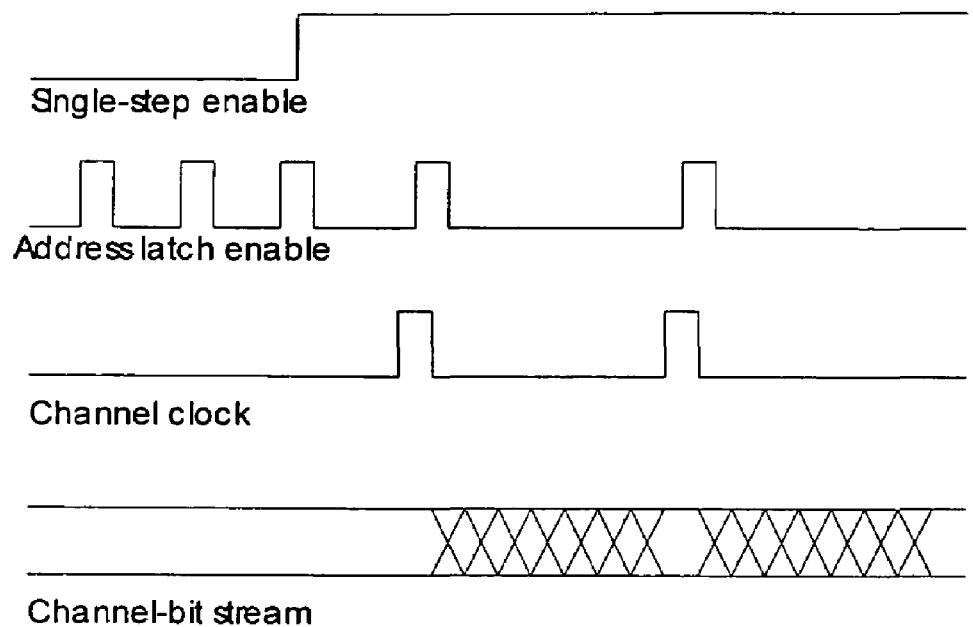
FIG. 6 illustrates timing of signals responsible for maintaining SYNChrony between a single-steppable processor and channel bit clock pulses.

The SYNChronization relationship between steps described above, is shown in FIG. 6 as waveforms.

Figure 7:
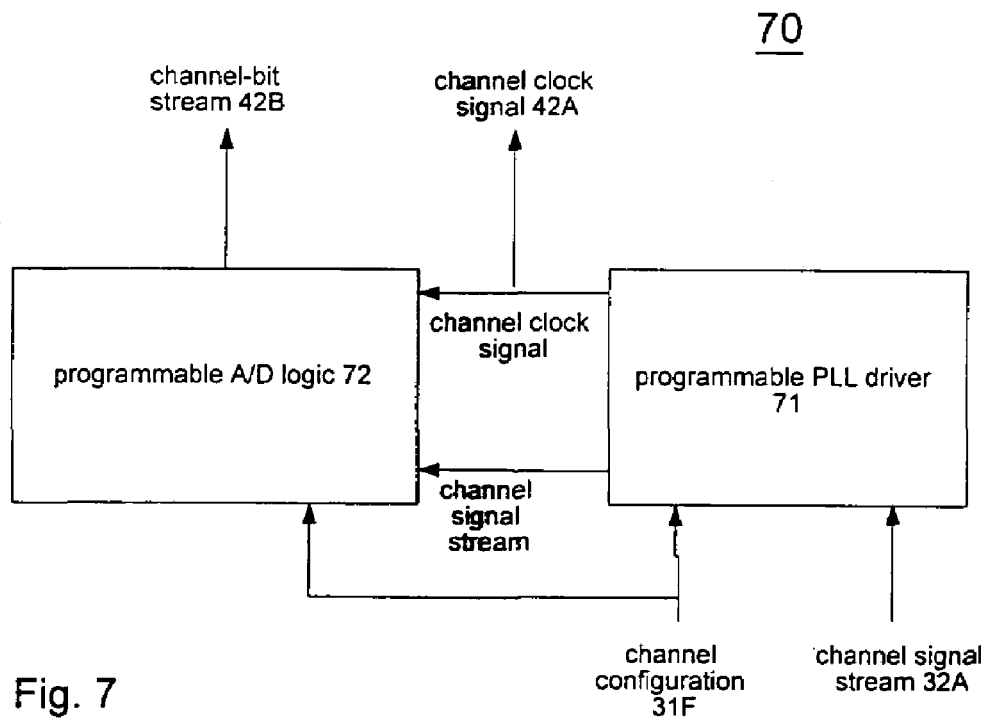
FIG. 7 illustrates a programmable channel bit converter that can extract channel bit clock signals from a channel signal stream and convert a channel signal stream to a channel bit stream based on channel-configuration data.

FIG. 7 depicts an embodiment of the programmable channel bit converter 42 shown in FIG. 4. A programmable phase-lock-loop (PLL) driver 71 extracts channel bit clock signals 42A based on the channel configuration or given reference data patterns. With the present channel bit clock signal 42A as temporal reference and given channel configuration 31F as conversion algorithm, the analog channel signal stream is converted to a binary channel bit stream 42B by a programmable analog-to-digital (A/D) converter 72.

After disclosing the design concept at component levels, real-time operation will be disclosed by example methods of reading data from a requested sector on a disc.

Figure 8:
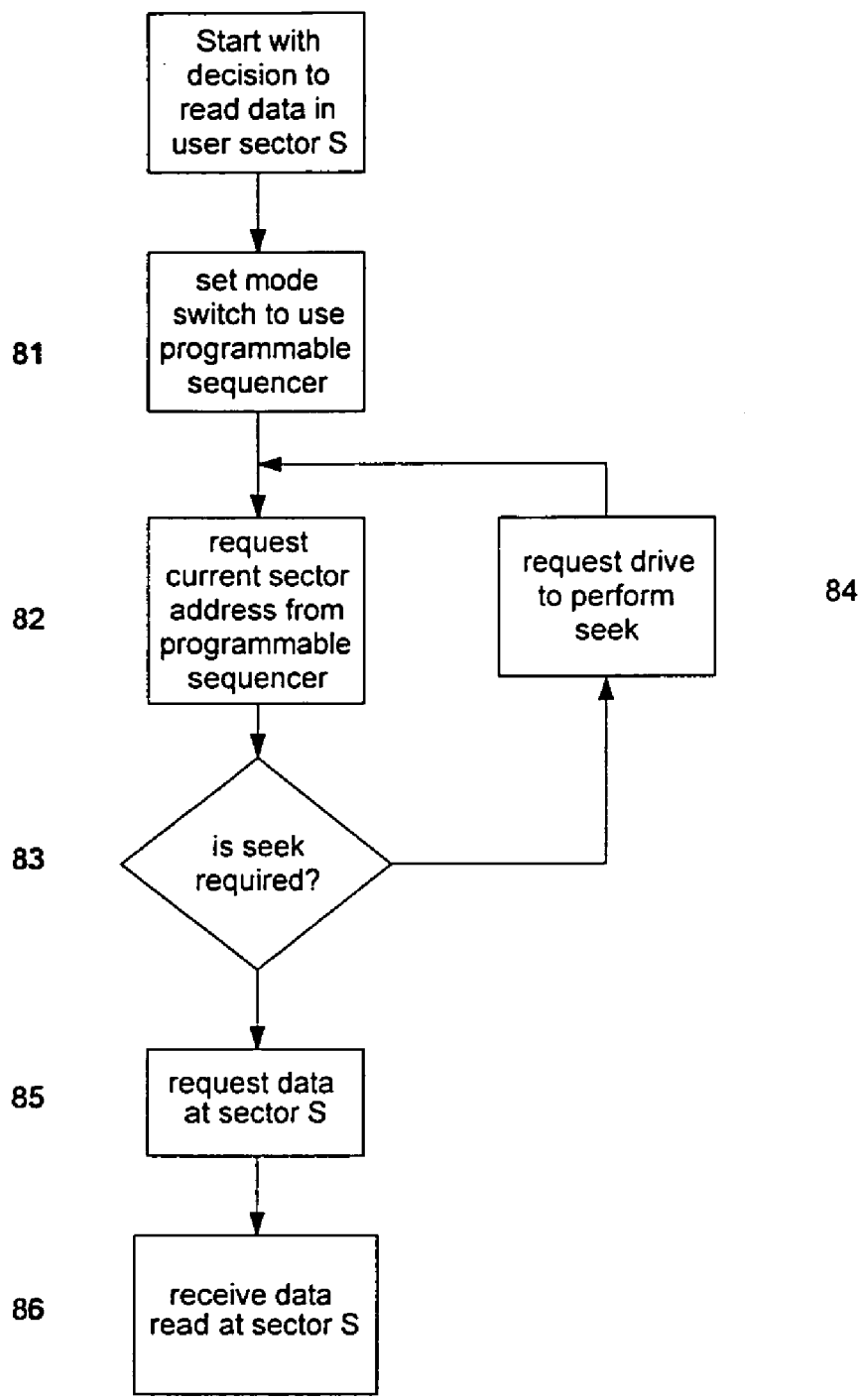
FIG. 8 illustrates a method by which the controller controls the adaptable player to read specified data from a disc in the user data format.

The flow-chart in FIG. 8 shows the main steps of an example method 80 of reading data from a requested sector.

Reading begins with step 81, where the controller issues a command to the mode switch 37 in FIG. 3 to direct the channel signal to the programmable sequencer 36. Then, at step 82 the controller requests the current sector address, where the read head is currently located, from the programmable sequencer. At step 83, the controller decides whether a seek is required. If the current address does not match the requested sector address, the controller moves to step 84 and issues a seek command to the drive to find the requested sector. If the current address matches the requested sector address, the controller moves to step 85 to instruct the drive to read the data from the current sector. At step 86, the controller receives the requested data. If data in more than one sector of a disc should be reading the steps shown in FIG. 8 are repeated until all requested data have been read.

Figure 9:
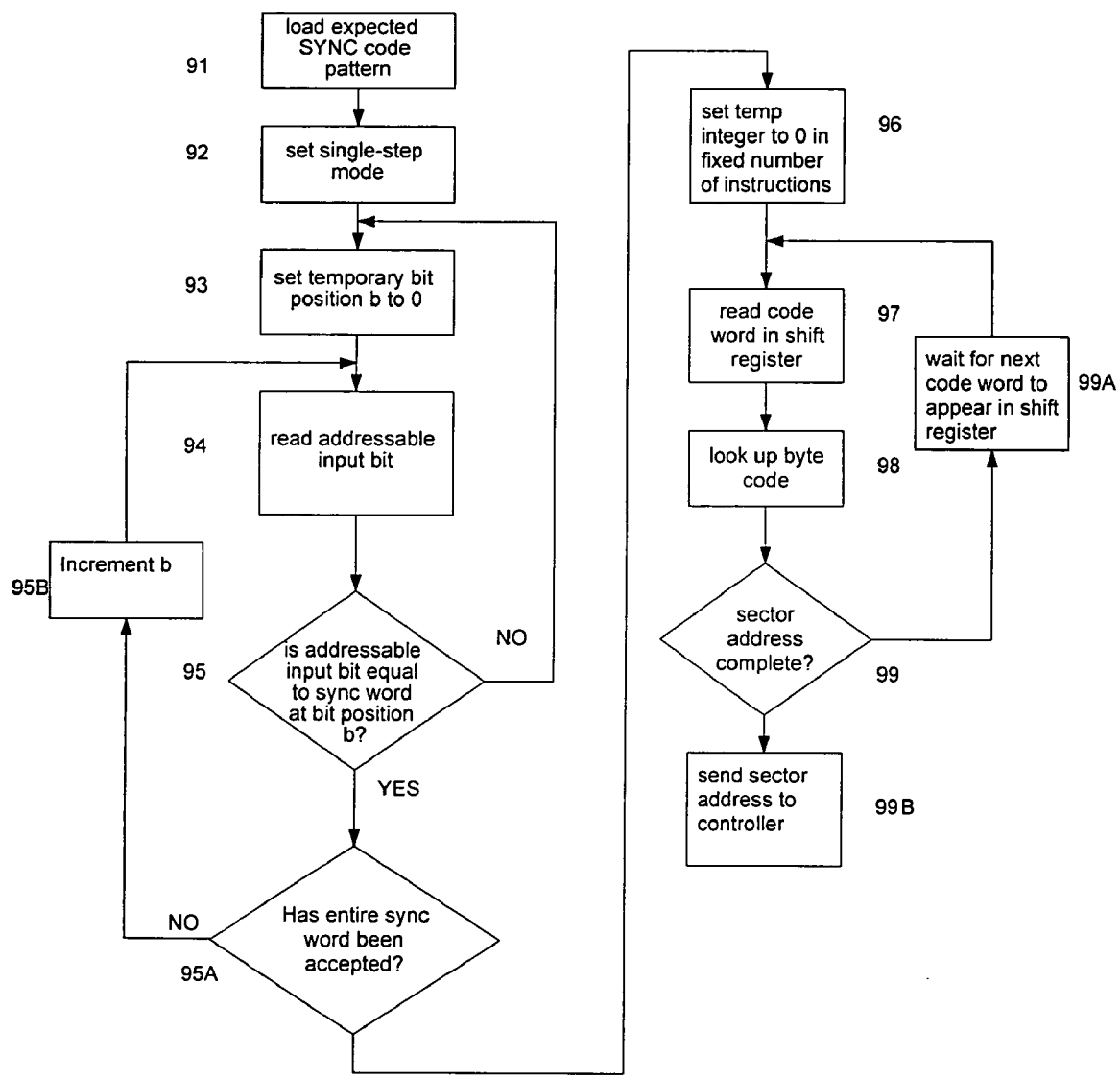
FIG. 9 illustrates a method by which the programmable sequencer reads the address of the next sector appearing in the channel.

Two basic operations are involved in method 80. The first operation reads sector addresses, and the second reads the requested data when the requested address is detected. FIG. 9 shows major steps of reading a requested sector address. The hardware design concept that this operation is based on has been described in connection with FIGS. 4 and 5. It is usually advantageous to move the head radially in an operation called a seek. After a seek, the exact location of the head on the track is not known. As a common practice in optical-storage technology, unique codes are used to mark reference positions in a channel bit stream. In particular, a SYNC code has a unique pattern that cannot be matched in any segment of equal length in the data portion of a channel bit stream. A unique SYNC code is embedded in a channel bit stream preceding a sector address by a fixed number of channel bits.

Figure 11:
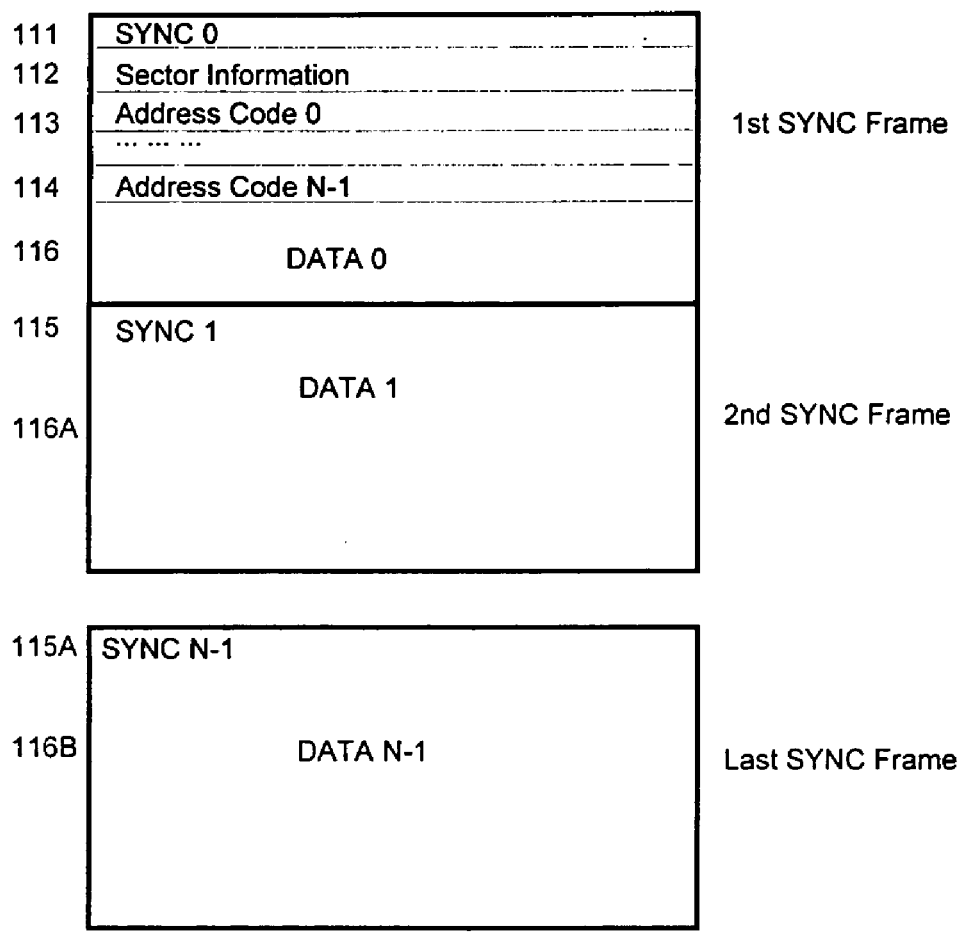
FIG. 11 illustrates how a sector of data is made up of SYNC codes and address and data code words.

Methods to read the sector address as well as requested data depend on the physical structure of a sector. As an example of sector physical structure, FIG. 11 shows the layout of DVD-ROM specified in ECMA 267, which is available from ECMA at 114 Rue du Rhone 1204, Geneva (Switzerland) or from the website www.ecma.ch. A method of reading the address and data codes in the structure will be disclosed.

As shown in FIG. 9, sector address reading begins with step 91 by loading the expected SYNC code pattern and continues at step 92 to set the microprocessor 51 into its single-step mode. At step 93, temporary bit position b is set to 0. At step 94, addressable bits are read one bit at one channel clock cycle. Every time a bit is read, the programmable sequencer compares it with the one at the corresponding position of the unique SYNC code. If the current input bit mismatches the one in the SYNC code, the process starts from step 93 again by setting the temporary bit position to zero. If the current bit does match the expected value, the sequencer checks whether the entire SYNC word has been accepted. If only part of a SYNC word was read, the temporary bit position b is incremented by one at step 95B and processing returns to step 94 to read the next input bit. If an entire SYNC word has been read, the sequencer moves to step 96 to set a temp integer to zero in a fixed number of instructions and gets ready to read address codes. Table 1 lists assembly-language instructions to detect a SYNC. As we can see, this sequence of instructions implicitly includes the logic loop from step 94 to step 95B of FIG. 9. When the processing reaches instruction BIT15 and results in no jump, the status that the entire SYNC code has been accepted is automatically established.

TABLE 1

Example Instructions for the Detection of a SYNC Code with a Pattern of 10 . . . 01

| Label | Instruction | | Expected SYNC Pattern |
|---|---|---|---|
| BIT0 | JNB BIT0 | ;jump if bit=0 | 1 |
| BIT1 | JB BIT0 | ;jump if bit=1 | 0 |
| . . . | . . . | . . . | . . . |
| BIT14 | JB BIT0 | ;jump if bit=1 | 0 |
| BIT15 | JNB BIT0 | ;jump if bit=0 | 1 |

As shown in FIG. 11, before the first address code 113 enters the shift register 52 of FIG. 5, codes 112 separating the preceding reference SYNC code and an address code are streaming in. These codes may also contain other information that can be used by the controller. The exact management of these codes is part of the format information. For demonstration purposes, the example method shown in FIG. 9 just counts the input channel bits until the first address code starts.

A shift register 52 with a size equal to or greater than the length of one address or data code word is allocated to store input channel bits. At each channel bit clock cycle, the shift register moves existing bits one position up and accepts one new input bit. When a whole channel bit code has been read, it is used at step 98 as a pointer to a pre-loaded look-up table and consequently converted to a byte code. After conversions of each code word, the programmable sequencer checks if the entire sector address is complete. If more address codes are expected, the method continues at step 97. If a complete address has been read, it is sent to the controller for verification at step 99B.

Figure 10:
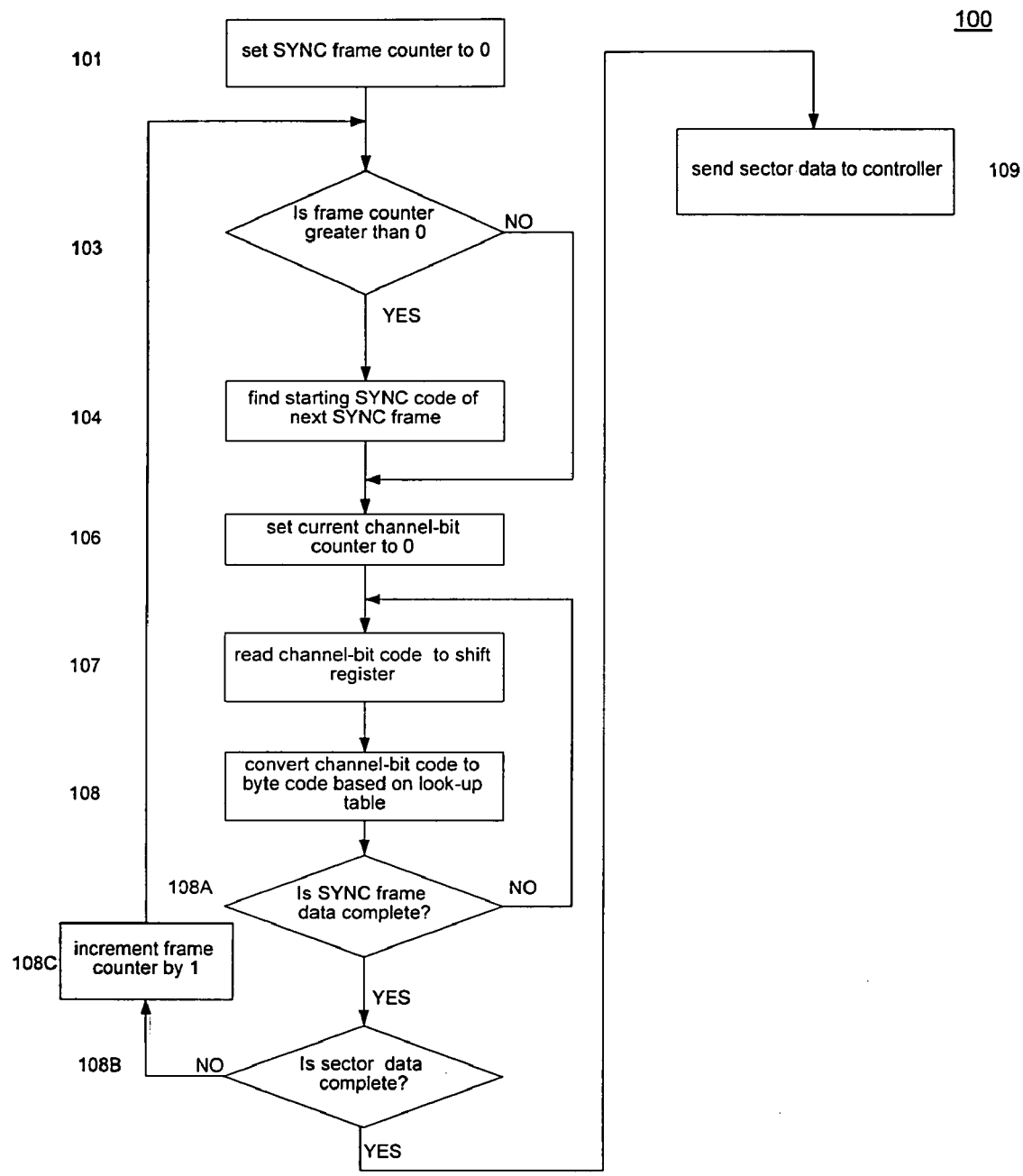
FIG. 10 illustrates a method by which the programmable sequencer reads the data of the next sector appearing in the channel.

Once the requested sector has been found, the user data in the requested sector is read with method 100 shown in FIG. 10. As shown in FIG. 11, user data within a sector 110 are recorded in several SYNC frames that are separated by characteristic SYNC codes 115 and 115A. The size of such frames is described in the format description so that the controller knows how many data codes are expected in one SYNC frame. The relative position of data codes in the channel bit stream can be determined by reading the status of the counter, and characteristic SYNC codes can be used to verify the position.

The programmable sequencer (36, 40) starts to read data code words at step 101, where the SYNC frame counter is set to 0. For the sector layout 110, the programmable sequencer (36, 40) can begin to read data in SYNC frame 0 immediately after the requested sector address is confirmed. To read data codes in the remaining SYNC frames, a leading SYNC code is always detected first. At step 103, the programmable sequencer checks the status of the frame counter. If the frame counter is 0, the programmable sequencer moves to step 106 and prepares to read data code words (113–114) in SYNC frame 0. If the frame counter is greater than 0, the programmable sequencer starts at step 104 to look for the starting SYNC code of the next SYNC frame before reading data codes. The detailed process at step 104 is shown as method 120 in FIG. 12. It is similar to steps 93–95A in finding the address SYNC code as shown in FIG. 9. However, method 120 also provides a way to abandon a search for a SYNC code that is late because of channel bit or channel clock errors.

With the positive return from SYNC code identification, the current channel bit counter is reset to zero at step 106.

Since both the data-code starting position and its length are known to the programmable sequencer 36 of FIG. 3, at step 107 channel bits are read into the shift register 52 of FIG. 5 in series and moved out in parallel at every code length. At step 108, channel bit codes are converted to associated byte codes based on a pre-loaded look-up table. The principle of the conversion is same as that described in FIG. 9 where channel bit codes are converted to byte codes corresponding to a sector address.

After each code conversion, the programmable sequencer (36, 40) determines at step 108A whether a SYNC frame is complete by implicitly reading the current channel bit counter. If more codes are expected from the current SYNC frame, steps 107 and 108 are repeated. When the current SYNC frame is complete, the programmable sequencer determines whether the current sector data is complete by reading the SYNC frame counter. If more SYNC frames are expected, the process restarts from step 103. If the current sector data is complete, the programmable sequencer returns its data to the controller at step 109 and waits for the next instruction.

Figure 12:
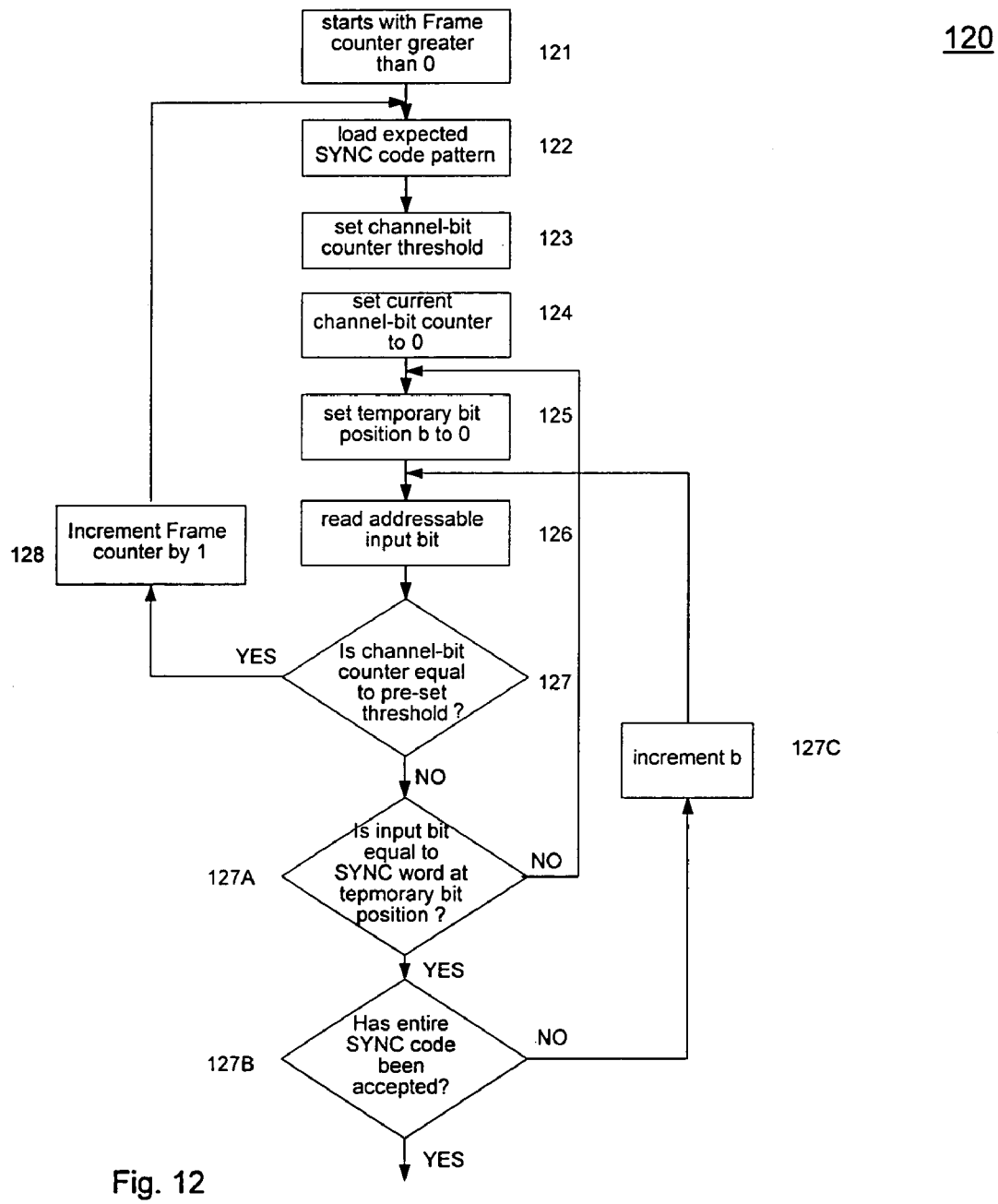
FIG. 12 illustrates the steps by which a SYNC code of a fixed number of bits is accepted.

Besides being used as process control parameter, the status of the current channel bit counter and the frame counter embedded in method 100 can be used to find and handle errors. Typical errors are missing or extra channel bits. FIG. 12 shows a method of handling errors while reading the SYNC code of a SYNC frame.

Method 120 in FIG. 12 can be considered as an expanded version of step 104 of method 100 shown in FIG. 10. The method 120 starts at step 121 with the frame counter greater than 0. At step 122, the expected SYNC code pattern is loaded, and at step 123, the programmable sequencer sets a channel bit counter threshold. This channel bit counter threshold is a number that indicates the boundary of a predefined number of channel bits. For example, if the current task is to read a SYNC code starting with the first bit of the code, the threshold is equal or greater than the length of SYNC code plus 1. In practical operation, the threshold can be set by an interrupt pointing to the first instruction of a routine that minimizes the amount of data lost or read incorrectly.

The method 120 continues with step 124 where the current channel bit counter is set to zero, and step 125 where the temporary bit position b is also set to zero. At step 126, addressable input bits start to be read. After each channel bit is read, the programmable sequencer 36 determines whether the channel bit counter reached the preset threshold.

If the threshold is not yet reached, the current bit is compared with the one at the corresponding position of the expected SYNC code. If the current input bit mismatches the one in the expected SYNC code, the process starts from step 125 again by setting the temporary bit position to zero. If the current bit does match the expected value, the sequencer determines whether the entire SYNC code word has been accepted. If only part of a SYNC code has been read, the temporary bit position b is incremented by one and reading continues at step 126; if an entire SYNC code has been read, the sequencer is ready to start the process of reading data-codes in the current SYNC frame.

If the threshold is reached, it means that the current channel bit is already beyond the last channel bit of the expected SYNC code, but the expected SYNC code has not been identified. This can happen because of bit errors. In this situation, the programmable sequencer gives up reading the missed current SYNC code and restarts at step 122 to read the SYNC code of the next SYNC frame after incrementing the frame counter by 1 at step 128. In order to avoid over running the next SYNC code, the channel bit counter threshold is set to a value which is longer than the SYNC code and shorter than the length of the entire SYNC frame. As an alternative, which is not shown in FIG. 12, the programmable sequencer can assume that a beginning of data code has been identified and continue to read data codes and to pass possibly erroneous data to the controller. Accordingly, the channel bit counter threshold should be set to the total length of codes in the current SYNC frame.

Depending on the robustness of the error-correction-code (ECC) used, the specific physical structure of a sector and the requirement on the data reliability, error-handling at the drive level can adopt different approaches to optimize performance.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An adaptable digital optical disc player for reading encrypted digital data, said player comprising:
   a mechanism that adapts to a copy-resistant read-only digital optical disc;
   wherein said copy-resistant read-only digital optical disc comprises a digital work, a variable software algorithm for encrypting said digital work, provided to a processor on said player, where a variable user-data format in a second zone encodes said digital work encrypted with said variable software algorithm, and a default format in a first zone encodes an implementation of said variable user-data format;
   wherein said first zone is located at an innermost predetermined section of said copy-resistant read-only digital optical disc and includes said implementation of said variable user-data format encoded in said default format;

a drive which accepts said read-only digital optical disc including said first and second zones including said encrypted digital data and outputs a channel-signal stream;

a controller which generates commands which cause said drive to access said first and second zones on said read-only digital optical disc;

a default sequencer which accepts commands from said controller and said channel-signal stream from said drive and returns a data-byte stream in real-time from said read-only digital optical disc through said drive and said default sequencer;

a multimedia processor which passes user requests from said adaptable digital optical disc player to said controller and receives said encrypted digital work and an implementation of said variable software algorithm from said controller;

a programmable-sequencer which receives programmable-sequencer commands and programmable-sequencer instructions from said controller and said channel-signal stream from said drive, and outputs a data-bit stream;

a default ECC-decoder which accepts commands from said controller and said data-byte stream from said default sequencer;

a programmable ECC-decoder which accepts programmable ECC-decoder commands and instructions from said controller and said data-bit stream from said programmable-sequencer;

wherein said controller reads said implementation of said user-data format in said default format through said default sequencer and said default ECC-decoder into said programmable sequencer into said programmable sequencer and reads said implementation of said algorithm and said encrypted digital work through said programmable sequencer and said programmable ECC decoder;

wherein said programmable-sequencer comprises:

a programmable channel-bit converter which accepts channel configuration data from said controller and said channel-signal stream from said drive and outputs a channel-bit clock and channel-bit stream;

a real-time instruction memory which receives instructions from said controller; and a single-steppable processor that can execute instructions in one-to-one correspondence with channel-bit clock pulses and is programmed to capture sequences of channel-bits representing data, said single-steppable receiver receiving commands from said controller, and receiving said channel-bit stream and said channel-bit clock from said programmable channel-bit converter.

2. The adaptable digital optical disc player according to claim 1, wherein said single-steppable processor that can execute instructions in one-to-one correspondence with channel-bit clock pulses and is programmed to capture sequences of channel-bits representing data comprises:

a microprocessor which has an address bus on which addresses are provided to said real-time instruction memory, a data bus on which said microprocessor receives instructions and data from said real-time instruction memory, a first input port which receives said programmable-sequencer commands from said controller, and a first output port which returns said real-time data to said controller;

a data shift register which is clocked by said channel-bit clock and receives said channel-bit stream at a serial data input, said shift register also having a parallel data output which is connected to a second input port of said microprocessor; and a flip-flop circuit which is clocked by said channel-bit clock, said flip-flop having an inverted preset input which is connected to a bit of a second output port of said microprocessor, an inverted clear input which is connected to an instruction address latch-enable output of said microprocessor, a data output which is connected to an inverted single-step enable input of said microprocessor, and a permanently asserted data input;

wherein said single-steppable processor that can execute instructions in one-to-one correspondence with channel-bit clock pulses and is programmed to capture sequences of channel-bits representing data sets said second output port high at specific times determined by said instructions and data in said real-time instruction memory and thereafter responds to said data output of said flip-flop by synchronizing said instructions with said channel-bit clock, said instructions also chosen to align sequences of channel bits received from said disc in said shift register for conversion to real-time data and transfer of said real-time data to said controller on said first output port.

* * * * *

UNITED STATES PATENT AND TRADEMARK OFFICE
CERTIFICATE OF CORRECTION

PATENT NO. : 7,249,384 B1 Page 1 of 1
APPLICATION NO. : 09/640360
DATED : July 24, 2007
INVENTOR(S) : Han Zou and Terence J. Nelson It is certified that error appears in the above-identified patent and that said Letters Patent is hereby corrected as shown below:

Title Page, (75) Inventors:
"Terry J. Nelson" should be --Terence J. Nelson--
(per Notice of Recordation of Assignment Document, Reel 018956, Frame 0059)

Col. 11, Lines 33-34, Claim 1:
Delete "into said programmable sequencer"

Col. 12, Line 2, Claim 1:
"receiver" should be --processor--

Signed and Sealed this

Twenty-seventh Day of November, 2007

JON W. DUDAS
*Director of the United States Patent and Trademark Office*